Figure 1:
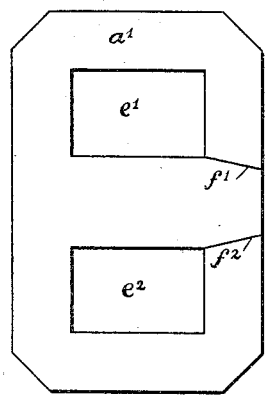

(No Model.)

A. SCHMID.
LAMINATED CORE FOR ELECTRICAL APPARATUS.

No. 406,776. Patented July 9, 1889.

WITNESSES:
George Brown Jr.
Hubert C. Tener

INVENTOR,
ALBERT SCHMID,
Pope, Edgecomb & Terry.
Att'yS,

UNITED STATES PATENT OFFICE.

ALBERT SCHMID, OF ALLEGHENY, ASSIGNOR TO THE WESTINGHOUSE ELECTRIC COMPANY, OF PITTSBURG, PENNSYLVANIA.

LAMINATED CORE FOR ELECTRICAL APPARATUS.

SPECIFICATION forming part of Letters Patent No. 406,776, dated July 9, 1889.

Application filed November 6, 1888. Serial No. 290,150. (No model.)

*To all whom it may concern:*

Be it known that I, ALBERT SCHMID, a citizen of the Republic of Switzerland, residing in Allegheny, in the county of Allegheny and State of Pennsylvania, have invented a new and useful Improvement in Laminated Cores for Electrical Apparatus, (Case No. 260,) of which the following is a specification.

My invention relates to certain improvements in the manufacture of cores for electrical apparatus—such, for instance, as the cores of electric inductoriums or converters, the cores of armatures for electric generators and motors, and other similar apparatus.

It has been found in practice that cores for electrical apparatus, which are subjected to a rapid change of magnetic condition, are more efficient and less liable to become heated when built of electrically-insulated laminæ of soft iron than when made solid. This is due to the fact that in solid cores the electric currents generated therein circulate within the same. Such currents, while of comparatively low electro-motive force, are of considerable quantity, and are liable to heat the core and render it less efficient. The use of laminated cores has therefore become quite universal. In some instances the adjacent laminæ have been held apart by narrow washers, leaving narrow air-spaces between the laminæ. In other instances thin sheets of paper, fiber, or other non-conducting material are placed between the laminæ of soft iron.

It is usually desirable that the mass of iron in proximity to the coils of wire applied to a core should be as great as possible. The presence of the insulation between the laminæ lessens somewhat the amount of iron which is contained in a core of given size, and to a corresponding extent tends to detract from the efficiency of the core. For this reason, it is desirable that the insulation between the laminæ should be as thin as possible. The use of washers or thin plates of insulating material is therefore objectionable, because it requires a considerable separation of the successive plates.

Another plan is to obtain the insulation by pasting very thin sheets of paper or other insulating material to one surface of the sheets of soft iron, from which the laminæ are afterward stamped. In this way very thin insulation may be obtained and the proportion of iron in the core correspondingly increased; but even with this form of insulation the non-conducting material is found to occupy about one-sixth as much space as the iron. Another difficulty sometimes encountered in this construction is that the operation of stamping the plates forms a burr along the cut edges, and when the plates are placed together the burrs are liable to pierce through the sheets of paper, and thus destroy to a greater or less extent the insulation between the different plates.

The object of the present invention therefore is to overcome these difficulties and to reduce to a minimum the spaces occupied by the insulation, and at the same time to provide a method of manufacturing the core which will secure the required insulation between the laminæ, and shall also cheapen and improve the construction of the core.

The invention consists in first stamping from sheets of magnetizable material—such, for instance, as iron—plates of the required size and form, from which to build up the core, then subjecting the plates to an annealing process, which is carried to such an extent that a thin film of oxide is formed over their entire surfaces, and over, also, the burrs or rough edges produced by the stamping process, and afterward building up the core by placing such plates side by side.

The annealing process is carried on in the following manner: The plates are arranged in small piles in a suitable annealing-box. The box is then placed in a furnace and gradually heated. This step, in practice, usually occupies from six to twelve hours. When the proper temperature has been reached, it is kept approximately constant for a sufficient time to produce the required effects. This may vary in different instances; but I usually continue to so heat the plates for about twelve hours. They are then allowed to cool gradually, the heat being gradually lessened. This may occupy a somewhat greater length of time—say from twelve to twenty-four hours. The gradual cooling secures thoroughly-annealed soft plates. After this treatment the plates are found to be coated with a dark film or very thin scale. This scale consists chiefly of magnetic oxide. It is such a poor conductor of electricity as in effect to amount to an insulator, and at the same time it is more or less magnetic, so that it serves, when the plates are placed together, not only to insulate them from each other, but also as a magnetizable material for the core, thus combining two desirable qualities. At the same time the insulation is extremely thin, and therefore allows the plates themselves to be brought into very close proximity. The thickness of the scale or film is found to be about two ten-thousandths of an inch upon each surface, so that the core consists almost entirely of magnetizable material, and the plates themselves are separated the smallest possible distance.

The oxide is very firmly attached to the surfaces of the plates and can only be removed by attrition, so that the plates may be handled without special care and without endangering the insulation.

It is desirable that the metal should be as soft as possible. As already stated, the annealing process has the effect of removing whatever temper may have been given to or remain in it, thus softening it and satisfying this requirement. The metal cannot in practice be so perfectly annealed while in the form of the large sheets from which the plates are stamped, as it is impossible to heat and cool them evenly; neither can it be thoroughly annealed before it is rolled into sheets, and the subsequent operation of rolling tends to harden it.

Figure 2:
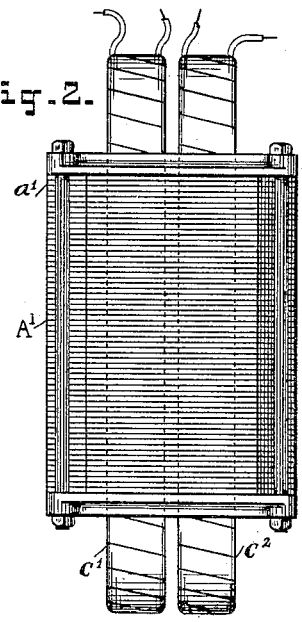
Figure 3:
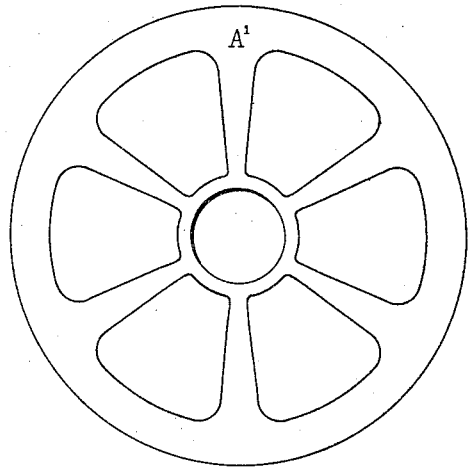

In the accompanying drawings, Figure 1 is a side view of a plate employed in building certain forms of converters, such as described, for instance, in Letters Patent No. 366,347, issued July 12, 1887, upon an application filed by me. Fig. 2 is a plan of a converter having a core of the character described. Fig. 3 illustrates an armature-plate, and Fig. 4 an armature-core composed of such plates.

Referring to Figs. 1 and 2, A represents the core of the converter of the construction which it is preferred to employ, and C' C² the primary and secondary coils, respectively. The converter may, however, be constructed with a single coil, a portion of the length being designed to be connected in one circuit and a portion in another; or a single coil may be connected entirely in one circuit. The core is composed of thin sheets or plates $a'$, of magnetizable material—such, for example, as soft iron. In preparing these plates rectangular plates are stamped with two holes $e'$ $e^2$, and these holes are preferably of a rectangular shape and of such size as to receive the coils of wire. Each hole $e'$ $e^2$ is cut open at $f'$ $f^2$. These cuts $f'$ $f^2$ may converge, as shown in the figure. After the plates have been properly stamped they are placed in suitable vessels and gradually heated to a very high temperature. They are kept at such temperature a proper length of time and then allowed to cool slowly. This step in the process has the double effect of thoroughly annealing and softening the metal and coating the surfaces with a thin film of magnetic oxide. This film also covers the edges and reduces the burrs produced by the stamping, covering them with an insulating material. In this manner the entire surface of each plate is sufficiently insulated to prevent any considerable circulation of Foucault or "eddy" currents in the core. The plates are then placed one against another, their central tongues being inserted within the coils in the same general manner as described in the patent before referred to, alternate plates being preferably inserted from opposite sides. The manner of building up the core and the shapes of the plates may, however, be materially varied without departing from the spirit of my invention.

Figure 4:
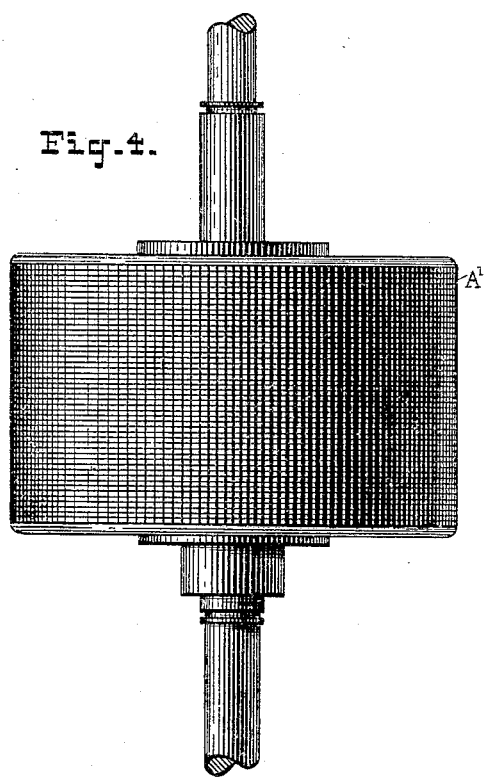

Figs. 3 and 4 illustrate the construction of the cores of armatures for electric machines. The plates A' are stamped as before, the shape and form being suited to the particular form of armature desired. They are then annealed and thereby softened, and coated by a film of insulating oxide, and afterward placed together side by side to form the complete armature-core. (Shown in Fig. 4.)

I desire it to be understood that I do not limit my claims to the particular forms of cores herein described, nor to the precise periods of heating and cooling, nor to the precise methods of annealing set forth in the specification, but present them as being best suited to illustrate and disclose my invention.

In another application, Serial No. 310,599, filed May 13, 1889, the method of forming cores herein described is set forth and claimed.

I claim as my invention—

1. A core for electrical apparatus, consisting of thin stamped plates of magnetizable material placed side by side and intervening layers or laminæ of electrically-insulating magnetic oxide formed upon and covering the entire surfaces and edges of the plates.

2. A core for electrical apparatus, composed of thin stamped plates of magnetizable material and intervening strata of non-electric-conducting oxide formed upon the surfaces of such plates and covering the edges and burrs thereof.

3. A core for electrical apparatus, consisting of stamped plates of magnetizable material placed side by side and in contact with each other, said plates being annealed after being stamped, whereby their entire surfaces and edges are coated by an oxide.

4. A core for electrical apparatus, consisting of alternate layers of magnetizable material and magnetic oxide formed by annealing after the plates are stamped.

5. A core for electrical apparatus, consisting of alternate layers of magnetizable material and magnetic oxide, the latter being formed in layers upon the surfaces of the plates and covering the edges and burrs.

6. A core for electric converters, consisting of annealed plates of magnetizable material placed side by side and intervening laminæ of insulating oxide formed upon the surfaces of the plates and covering the edges thereof, in combination with coils of insulated wire.

In testimony whereof I have hereunto subscribed my name this 5th day of November, A. D. 1888.

ALBERT SCHMID.

Witnesses:
CHARLES A. TERRY,
C. C. WOLFE.